United States Patent [19]

Caron

[11] Patent Number: 5,131,763
[45] Date of Patent: Jul. 21, 1992

[54] BEARING HUB EQUIPPED WITH A DEVICE FOR DETECTING THE ROTATIONAL SPEED

[75] Inventor: Fabrice Caron, Montigny-le-Bretonneux, France

[73] Assignee: SKF France, France

[21] Appl. No.: 684,207

[22] Filed: Apr. 12, 1991

[30] Foreign Application Priority Data

Apr. 23, 1990 [FR] France .................. 90 05133

[51] Int. Cl.⁵ .................. F16C 19/08; G01P 3/48
[52] U.S. Cl. .................. 384/448; 310/168; 324/207.25
[58] Field of Search .............. 384/448; 310/168, 155; 324/207.25, 166, 173, 174

[56] References Cited

U.S. PATENT DOCUMENTS

| | | | |
|---|---|---|---|
| 3,772,549 | 11/1973 | Cumming | 310/168 |
| 4,171,495 | 10/1979 | McNinch | 310/168 X |
| 4,783,180 | 11/1988 | Hayashi | 384/448 |
| 4,850,722 | 7/1989 | Bayer | 384/448 |
| 4,968,156 | 11/1990 | Hajzler | 384/448 |
| 4,969,694 | 11/1990 | Caron | 310/168 X |

FOREIGN PATENT DOCUMENTS

| | | | |
|---|---|---|---|
| 2756930 | 7/1978 | Fed. Rep. of Germany | 310/168 |
| 237249 | 9/1989 | Japan | 384/448 |
| 2207470 | 2/1989 | United Kingdom | 384/448 |

*Primary Examiner*—Thomas R. Hannon
*Attorney, Agent, or Firm*—Beveridge, DeGrandi & Weilacher

[57] ABSTRACT

Wheel bearing hub for a vehicle, equipped with a pulser (16) and with a sensor (18). The pulser is fitted onto the rotating element (1) of the hub and comprises a protective part which externally encases the sensor head (17) sealingly, so as to isolate the latter from what is variously thrown up from the external environment.

18 Claims, 3 Drawing Sheets

BEARING HUB EQUIPPED WITH A DEVICE FOR DETECTING THE ROTATIONAL SPEED

The present invention relates to a bearing hub, for example a wheel bearing hub for a vehicle, equipped with a device which consists of a pulser or coding element and a sensor for detecting the rotational speed.

Conventionally, wheel bearing hubs for vehicles comprise a rotating element to which are fastened a wheel and a brake-disk or brake-drum plate for braking the wheel, a non-rotating element for foxing the hub to the vehicle and rolling elements arranged between the rotating element and the non-rotating element.

Raceways for the rolling elements can be made directly in the rotating and/or non-rotating element or in attached rings which are fixed to the rotating elements or to the non-rotating element.

Where a non-driving wheel is concerned, the non-rotating element generally consists of a stub/stub-holder assembly, to which non-rotating rings of the bearing are fastened, with the possibility of machining one of the non-rotating rings directly on the stub. In this embodiment, the rotating element is mounted externally around the non-rotating element coaxially.

When a driving wheel is concerned, the rotating element consists of the stub which passes internally and coaxially through the non-rotating element and terminates in a wheel and brake-disk support.

Traditionally, the rolling elements are protected axially by means of gaskets which define a closed space in order, on the one hand, to retain the lubricating grease for the bearing and, on the other hand, to prevent impurities coming from the external environment from penetrating into the bearing.

It is customary to equip the wheel bearing hub with a device for detecting the rotational speed of the wheel, especially when the vehicle is equipped with a so-called "ABS" wheel anti-lock braking system.

In general terms, the detection device consists of a coding element, also called a pulser, fixed to the rotating element of the hub and of a sensor mounted in a stationary manner on the non-rotating element of the hub. In conventional assemblies, the pulser is composed of a ring made of ferromagnetic material and provided with teeth or with notches; the sensor is often of the inductive type, the head of the said sensor being located opposite the teeth or notches of the pulser. The effect of the rotation of the pulser is to vary the electric signals of the current induced in a coil of the sensor in proportion to the rotational speed of the pulser.

The major disadvantage of the known conventional assemblies is that the head of the sensor is often exposed to splashes of water and dirt coming from the external environment, the said splashes risking eventually damaging the head of the sensor or disrupting the accuracy of the information supplied by the device for detecting the rotational speed of the wheel. French patent application 85.13,541 and U.S. Pat. No. 4,783,180 may be mentioned in this respect.

Solutions provided hitherto for overcoming this major disadvantage all involve assembling additional sealing pieces on the rotating element and/or on the non-rotating element of the hub, to form a closed space in which the pulser and the sensor are accommodated. French patent application 88.06,235 may be mentioned as an example.

Such sealing pieces require special designs of the wheel hub for assembling them. This results in a structural complication of the wheel hub, this complication inevitably bringing about an increase in the production cost of the hub. Moreover, the need to have additional sealing pieces gives rise to increased difficulties both in terms of production and storage and as regards the mounting of the wheel hub.

The object of the present invention is to provide a bearing hub equipped with a device for detecting the rotational speed, the sensor of which is protected effectively and simply against what is variously thrown up from the external environment.

Another object of the invention is to overcome the disadvantages of the conventional sealing assemblies by use of a special form of the pulser which likewise provides protection for the sensor against the external environment.

The bearing hub according to the invention comprises a rotating element and a non-rotating element arranged coaxially one around the other, with rolling elements arranged between them. The bearing hub is equipped with a device for detecting the rotational speed of the rotating element in relation to the non-rotating element, the said detection device comprising a sensor fixed to the non-rotating element and a pulser in a form of revolution fixed to the rotating element and interacting with the sensor.

According to the invention, the pulser comprises a mounting part for fastening the pulser to the rotating element and a protective part without contact with the rotating element and forming a casing which encloses the head of the sensor at least radially. The protective part of the pulser comprises a plurality of magnetic-field disturbance elements passing by rotating and without contact in front of the head of the sensor.

The disturbance element can be produced in the form of teeth, of bosses, of notches made in a piece of ferromagnetic material or of magnetic masses consisting of alternate magnetic poles. When the pulser is driven in rotation at the same time as the rotating element, the passage of the disturbance elements in front of the head of the sensor has the effect of producing a current generated by induction in the coil of the sensor, the inductive current varying at a frequency proportional to the rotational speed of the pulser.

According to the invention, the protective part of the pulser must form a screen at least radially in order to separate the head of the sensor from the external environment. One end of the protective part located outside the sensor preferably interacts with a surface of the non-rotating element adjacent to the sensor, to form either a narrow passage or a seal rubbing by means of a flexible plastic lip attached to the said end of the pulser, the sealing means thus formed preferably not being located in the immediate vicinity of the head of the sensor, the prevent the latter from being exposed to the external environment if the sealing means fails.

The detection device consisting of the pulser and of the sensor is advantageously arranged in the vicinity of an outer row of the rolling elements in order to make assembly easier. It is known to protect rolling elements by means of a gasket. The pulser has to be mounted in the vicinity of the gasket for the rolling elements, so as to form a substantially annular closed space delimited by the gasket, the pulser and that face of the non-rotating element with which the pulser forms a sealing means. This closed space is then intended for receiving the sensor head which is preferably embedded in the non-rotating element.

According to one embodiment of the invention, the protective part of the pulser replaces the gasket of the rolling elements.

Because the head of the sensor has to be protected from the external environment, the protective part of the pulser must not allow dirt to pass through into the closed space. The pulser can be produced form a ferromagnetic sheet suitably deep-drawn so that it can be fitted onto the rotating element. If the disturbance elements are notches made in the protective part, these notches are then closed off by means of a synthetic material, such as rubber or a moulded-on plastic.

Of course, the present invention makes it possible to have a detection both radial, axial and inclined relative to the axis of rotation over a surface of revolution, and in fact the form of the pulser can easily be adapted to the orientation of the head of the sensor.

The invention will be understood better from a study of the detailed description of some embodiments of the invention taken as non-limiting examples and illustrated by the accompanying drawings in which, FIG. 1 is a diagrammatic view in axial section of a wheel bearing hub for a non-driving wheel according to a first embodiment of the invention;

Figure 1:
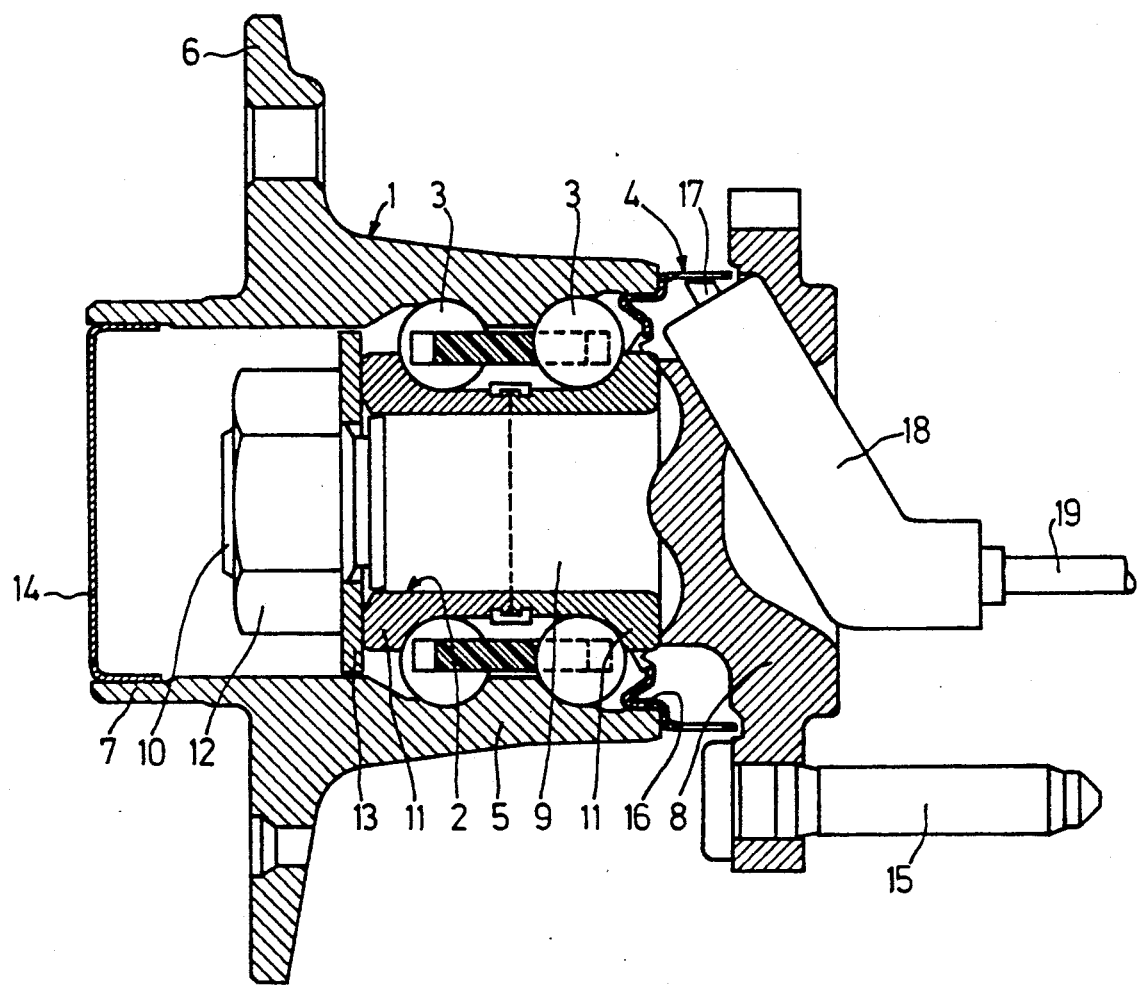

As shown in FIG. 1, the wheel bearing hub comprises a rotating element 1, a non-rotating element 2 and two rows of rolling elements 3. The hub is equipped with a device 4 for detecting the rotational speed of the rotating element 1 in relation to the non-rotating element 2.

The rotating element 1 has a part 5 forming an outer bearing ring, a flange 6 for mounting a wheel and a brake-disk or brake-drum plate, which are not shown, and a tubular bearing surface 7 for centering the wheel and plate, which are not shown.

The non-rotating element comprises a stub holder 8, a stub 9, the end part 10 of which is threaded, two inner bearing rings 11 around the stub 9, and a nut 12 interacting with the thread of the end part 10 of the stub for locking the inner rings 11 on the stub/stub-holder assembly by means of a washer 13. The space within the tubular bearing surface 7 is enclosed by a closing cover 14 fitted to the end of the tubular bearing surface 7. The non-rotating element 2 is fixed to the vehicle by a plurality of fastening means 15.

Fitted axially onto the free end of the outer bearing ring 5 is a pulser 16 which is therefore fixed to the rotating element 1. Within the pulser 16 is the head 17 of a sensor 18 which can, for example, be of the inductive type, the sensor being embedded in the stub holder 8 of the non-rotating element 2. A connecting cable 19 transmits electric signals generated by the sensor 18 to a processing system (not shown).

Figure 2:
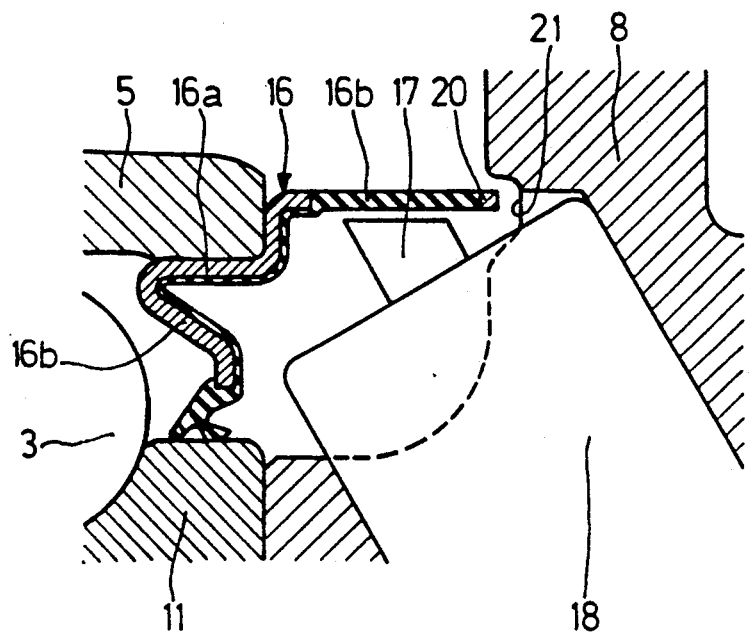
FIG. 2 is a diagrammatic view of a detail of FIG. 1.
Figure 3:
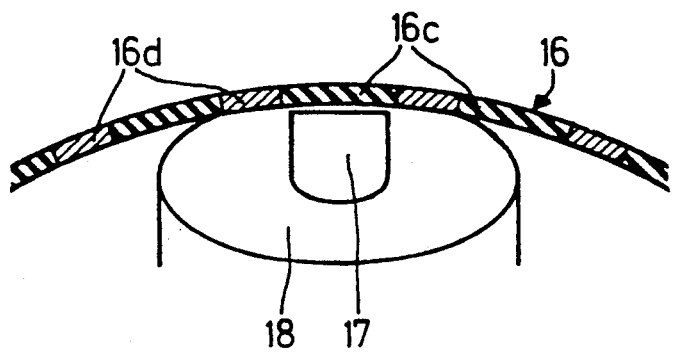
FIG. 3 is a partial view according FIG. 2.

As shown in FIGS. 2 and 3, the pulser 16 produced in the form of a ferromagnetic sheet comprises a fitting part 16a and a protective part 16b. The protective part 16b has a tubular portion, in which is made a plurality of notches 16c spaced uniformly by means of solid bars 16d, and a portion forming a gasket of the rolling elements 3. The free end 20 of the tubular portion of the protective part 16b forms with a face 21 of the stub holder 8 a narrow passage constituting a sealing means against what is thrown up from outside. The head 17 of the sensor 18 is located in the space closed by means of the pulser 16 and the face 21 of the stub holder 8. The notches 16c are filled with a non-metallic material, preferably of rubber or plastic, so as to produce a uniform surface in the tubular portion of the pulser 16. The head 17 of the sensor 18 is placed very near to and opposite the bars 16d and notches 16c, in order to allow a high sensitivity of detection of the magnetic-field variations when the pulser 16 is driven in rotation at the same time as the rotating element 1. As a result of the special form of the pulser 16, the sensor head 17 is protected effective against dirt coming from the external environment. This results in a high long-term accuracy of detection of rotation of the pulser 16.

Figure 4:
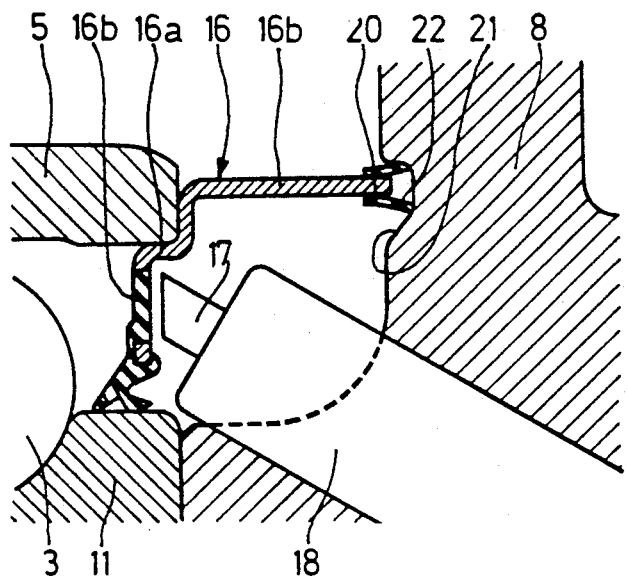
FIG. 4 is a partial detailed sectional view according to a second embodiment of the invention.

In the alternative version of FIG. 4, the notches 16c filled with rubber form part of the gasket of the rolling elements 3. In this case, detection is axial by means of the head 17 of the sensor, instead of being radial, as in the preceding example. Furthermore, it is possible to provide a flexible sealing lip 22 connected to the free end 20 of the tubular portion of the pulser 16, so as to form with the face 21 of the stub holder 8 a rubbing seal which performs the function of sealing the space in which the sensor head 17 is located.

Figure 5:
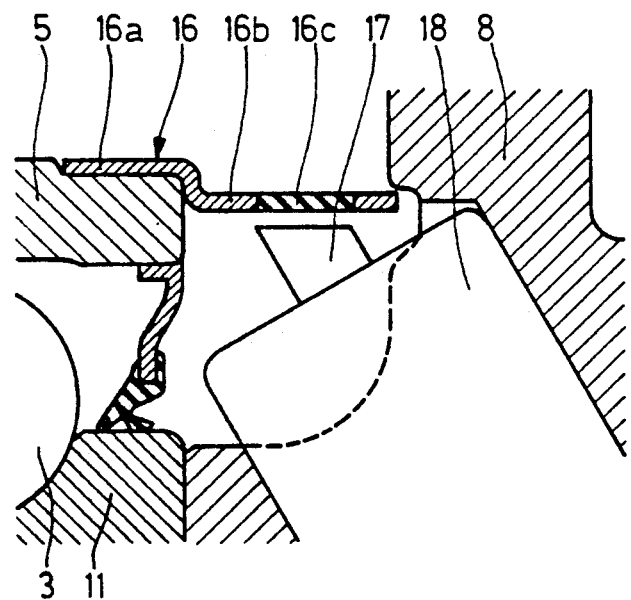
FIG. 5 is a partial diagrammatic sectional view according to a third embodiment of the invention.

According to the embodiment illustrated in FIG. 5, the fitting part 16a of the pulser 16 is mounted on the outer cylindrical face of the outer bearing ring 5, the protective part 16b of the pulser 16 forming a gasket for the rolling elements 3. The detection is radial in an identical way to the embodiment illustrated in FIGS. 1 to 3.

Figure 6:
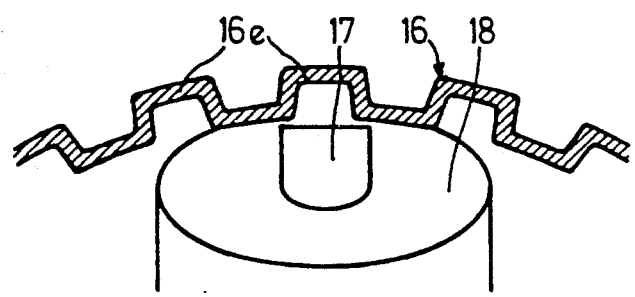
FIG. 6 is a partial view in radial section showing the structure of the field disturbance elements of the pulser according to one embodiment of the invention.

FIG. 6 shows a form of pulser 16 which, instead of having the notches 16c, is equipped with corrugations or teeth 16a obtained by means of local deformations of the ferromagnetic sheet.

The examples illustrated above all relate to a wheel bearing hub, the outer ring of which consists of the rotating element. When the inner rings form part of the rotating element, the outer ring constitutes the non-rotating element on which the sensor 18 is mounted. In this case, it is sufficient to provide the pulser 16, the fitting part of which interacts with one of the inner bearing rings of the rotating element and the protective part of which extends outward, subsequently forming an outer casing protecting the head of the sensor 18 according to the same criterion as in the preceding examples. In such an embodiment, the rotating element (1) would support the wheel and be externally surrounded by the non-rotating element (2).

I claim:

1. A bearing hub assembly comprising:
   a rotating element;
   a non-rotating element having a first portion coaxially arranged relative to said rotating element, and a second portion extending radially outside of a part of said rotating element which is proximal to said second portion;
   rolling elements arranged between said rotating element and said first portion of said non-rotating element;
   a sensor fixed to said non-rotating element and provided with a sensing head;

a pulser means having a mounting portion fitted onto a cylindrical surface of said part of said rotating element, and a protective portion which has a tubular portion extending coaxially beyond said rotating element to terminate in a free end that is proximal with a surface of said second portion of said non-rotating element to thereby form a first seal for protecting said sensing head, said protective portion carrying a plurality of disturbance elements for generating signal variations in the sensor for detection of rotational speed of said rotating element relative to said non-rotating element.

2. A bearing hub assembly according to claim 1, wherein aid first seal is formed of a rubbing seal comprised of a flexible lip.

3. A bearing hub assembly according to claim 1, wherein a narrow passage is formed between said free end of said axial portion and said surface of said second portion of said non-rotating element.

4. A bearing hub assembly according to claim 1, wherein said part of said rotating element radially inside of said second portion of said non-rotating element is an outer bearing part.

5. A bearing hub assembly according to claim 4 wherein said second portion of said non-rotating element extends radially outside of said tubular portion of said protective portion of said pulser means.

6. Bearing hub according to claim 1, wherein the field disturbance elements of the pulser consist of notches closed off by a synthetic material and spaced uniformly by means of solid bars.

7. Bearing hub according to claim 1, wherein the disturbance elements of the pulser consist of local deformations of a sheet of ferromagnetic material constituting the pulser.

8. Bearing hub according to claim 1, wherein said hub is further comprised of a wheel bearing hub for a vehicle, of which the rotating element supporting a wheel is arranged around the non-rotating element.

9. A bearing hub assembly comprising:
a rotating element;
a non-rotating element having a first portion coaxially arranged relative to said rotating element, and a second portion extending radially outside of a part of said rotating element which is proximal to said second portion;
rolling elements arranged between said rotating element and said first portion of said non-rotating element;
a sensor fixed to said non-rotating element and provided with a sensing head;
a pulser means having a mounting portion fitted onto a cylindrical surface of said part of said rotating element, and a protective portion which has a tubular portion extending coaxially beyond aid rotating element to terminate in a free end that is proximal with a surface of said second portion of said non-rotating element to thereby form a first seal for protecting said sensing head, and a radial portion which extends radially between said sensing head and said rolling means to terminate in a free end that is proximal with a surface of said first portion of said non-rotating element to thereby form a second seal for protecting said sensing head, said protective portion carrying a plurality of disturbance elements for generating signal variations in said sensor for detection of rotational speed of said rotating element relative to aid non-rotating element.

10. A bearing hub assembly according to claim 9, wherein said part of said rotating element radially inside of said second portion of said non-rotating element is an outer bearing part.

11. A bearing hub assembly according to claim 10 wherein said second portion of said non-rotating element extends radially outside of said tubular portion of said protective portion of said pulser means.

12. A bearing hub according to claim 9, wherein said disturbance elements are formed by notches closed off by a synthetic material and spaced uniformly by means of solid bars.

13. A bearing hub according to claim 9, wherein aid disturbance elements are formed by local deformations of a sheet of ferromagnetic material.

14. A bearing hub according to claim 9, wherein said hub is further comprised of a wheel bearing hub for a vehicle, of which the rotating element supporting a wheel is arranged around said non-rotating element.

15. A bearing hub assembly according to claim 9, wherein said first seal is formed of a rubbing seal comprised of a flexible lip.

16. A bearing hub assembly according to claim 9, wherein a narrow passage is formed between said free end of said axial portion and said surface of said second portion of said non-rotating element.

17. A bearing hub assembly according to claim 9 wherein a narrow passage is formed between said free end of said radial portion and said surface of said first portion of said non-rotating element.

18. A bearing hub assembly according to claim 17, further comprising a gasket which contacts said free end of said radial portion and said surface of said first portion of said non-rotating element.

* * * * *